United States Patent [19]
Uchida

[11] Patent Number: 5,927,245
[45] Date of Patent: Jul. 27, 1999

[54] COMBUSTION CHAMBER FOR ENGINE

[75] Inventor: Masahiro Uchida, Iwata, Japan

[73] Assignee: Yamaha Hatsudoki Kabushiki Kaisha, Iwata, Japan

[21] Appl. No.: 08/863,842

[22] Filed: May 27, 1997

[30] Foreign Application Priority Data

May 25, 1996 [JP] Japan ..................................... 8-153187

[51] Int. Cl.$^6$ ...................................................... F02B 3/02
[52] U.S. Cl. ........................... 123/301; 123/302; 123/305
[58] Field of Search ...................................... 123/295, 302, 123/305, 301

[56] References Cited

U.S. PATENT DOCUMENTS

| | | | |
|---|---|---|---|
| 2,345,256 | 3/1944 | Hedlund | 123/305 |
| 2,768,615 | 10/1956 | Taylor et al. | 123/305 |
| 4,649,876 | 3/1987 | Ohmi et al. | 123/302 |
| 4,811,708 | 3/1989 | Gruden | 123/302 |
| 5,140,958 | 8/1992 | Kobayashi et al. | 123/302 |

FOREIGN PATENT DOCUMENTS 5-280343  10/1993  Japan ..................................... 123/305

*Primary Examiner*—Andrew M. Dolinar
*Attorney, Agent, or Firm*—Knobbe, Martens, Olson & Bear LLP

[57] ABSTRACT

A multiple cylinder, multiple valve internal combustion engine having direct cylinder injection. The cylinder injectors are disposed on a longitudinally extending plane that contains the cylinder bore axis and are inclined at acute angles to planes perpendicular to the longitudinal plane and containing the cylinder bore axis. The spark plugs are located at the intersection of both planes and are inclined to the transverse plane similarly to the fuel injectors. An arrangement is disclosed for controlling the intake charge into the engine so as to be directed primarily on the side of the combustion chamber where the fuel injector injects under at least low speed, low load conditions.

19 Claims, 4 Drawing Sheets

COMBUSTION CHAMBER FOR ENGINE

BACKGROUND OF THE INVENTION

This invention relates an internal combustion engine and more specifically to the combustion chamber for such an engine and the disposition of the various components of the engine within the combustion chamber.

In the interests of improving the performance of internal combustion engines, at least in the terms of fuel economy, power output and exhaust emission control, fuel injection has been employed as a form of charge former. By utilizing fuel injectors, it is possible to obtain more accurate control and also to adjust the control on a cycle-by-cycle basis. In order to even further enhance the performance of the engine, direct cylinder injection can be utilized.

With direct cylinder injection, the fuel injector is mounted normally in the cylinder head and injects the fuel directly into the combustion chamber. In addition to providing more accurate control, direct cylinder injection also offers the possibility of obtaining stratification.

With a stratified charge, the entire combustion chamber need not be filled with a homogeneous, stoichiometric mixture under all running conditions. It is, of course, necessary to have a stoichiometric present at the gap of the spark plug at the time the plug is fired so as to ensure combustion initiation. However, if the charge can be stratified under low and medium loads, the stoichiometric charge need only be present at the gap of the spark plug at the time of firing.

However, in order to further enhance and improve engine performance, the use of overhead valves and overhead camshafts is utilized. Frequently, plural valves (at least two intake or exhaust valves per cylinder) are employed. Obviously, the placement of these valves, their actuating mechanism, the spark plug or plugs and the direct cylinder fuel injection presents considerable problems.

It is, therefore, a principal object of this invention to provide an improved combustion chamber and component layout for an engine.

It is a further object of this invention to provide an improved cylinder head mounting arrangement for the fuel injector of a multi-valve engine.

Where the engine has multiple cylinders, the positioning of the components is further complicated. It is, therefore, a still further object of this invention to provide an improved fuel injector and cylinder head arrangement for a multiple cylinder internal combustion engine.

SUMMARY OF THE INVENTION

This invention is adapted to be embodied in an internal combustion engine that is comprised of a cylinder block that defines at least one cylinder bore. A piston reciprocates in the cylinder bore. A cylinder head is affixed to the cylinder block in closing relationship to one end of the cylinder bore. The cylinder head, cylinder bore and piston define a variably volume chamber in which combustion occurs. An intake passage extends through one side of the cylinder head and terminates in at least one intake port serving the variable volume chamber on one side of a longitudinally extending plane passing through the axis of the cylinder bore. An exhaust passage extends through the other side of the cylinder head and terminates in at least one exhaust port in the variable volume chamber on the other side of the longitudinally extending plane for the discharge of exhaust products from the variable volume chamber. A spark plug has a gap that extends into the variable volume chamber for firing a charge in the chamber. A fuel injector lies substantially on the aforenoted longitudinally extending plane and has an injector nozzle port that extends into the variable volume chamber on one side of the cylinder bore.

DETAILED DESCRIPTION OF THE PREFERRED EMBODIMENTS OF THE INVENTION

Figure 1:
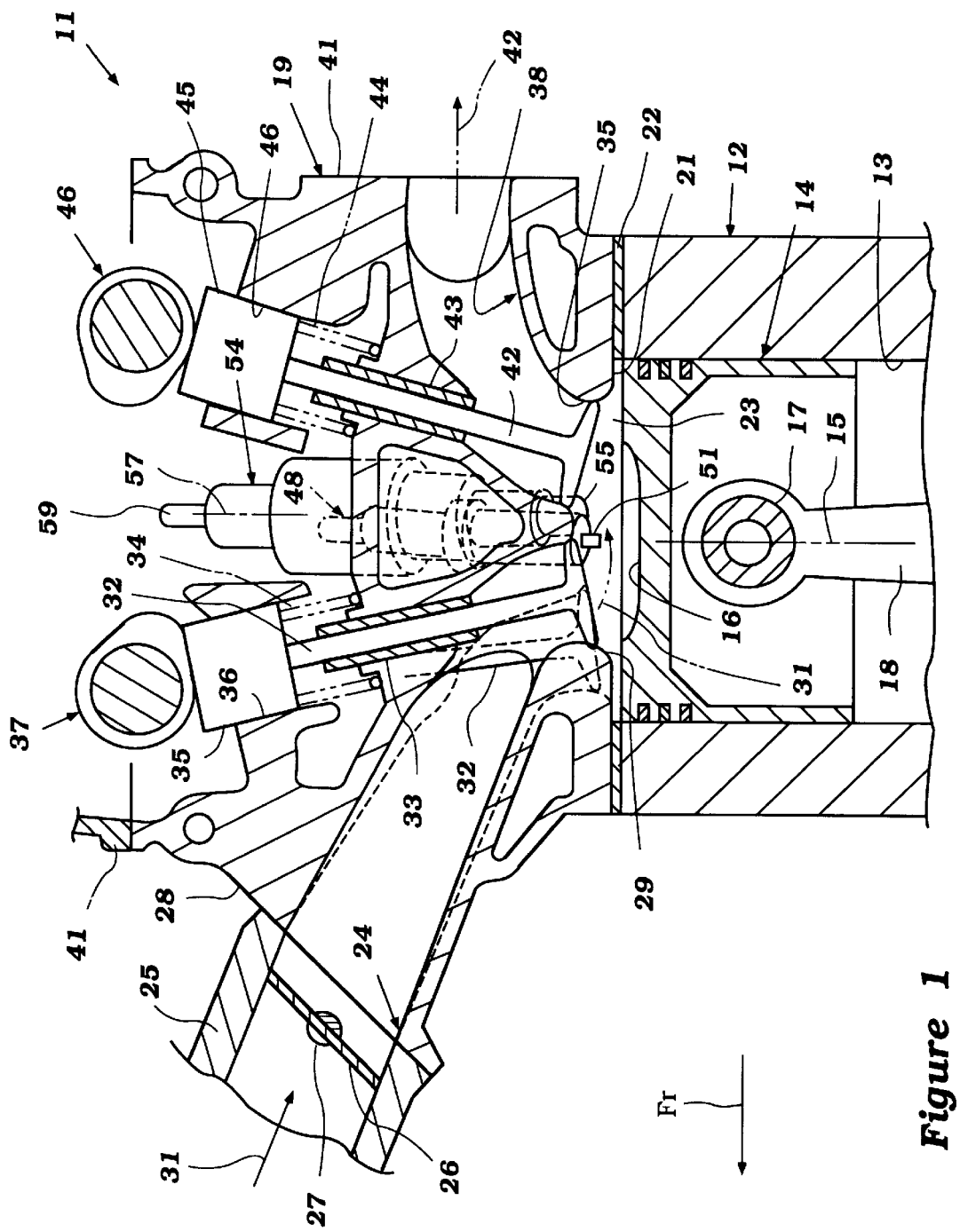
FIG. 1 is a partial cross-sectional view taken through a single cylinder of a multiple cylinder internal combustion engine construction in accordance with an embodiment of the invention.
Figure 2:
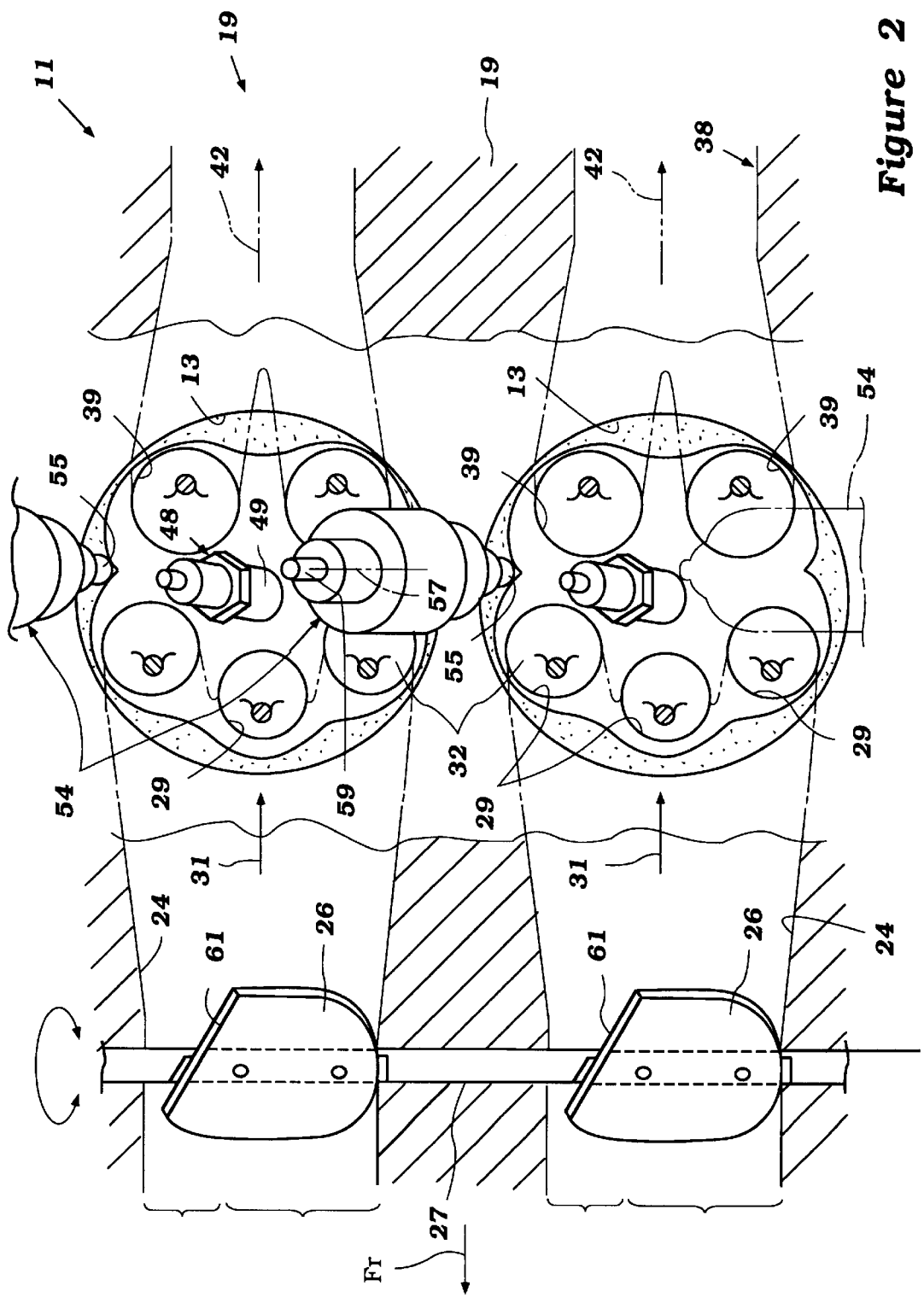
FIG. 2 is a cross-sectional view taken along a plane that extends generally through the axes of the intake and exhaust passages of the engine and depicts an additional cylinder of the multiple cylinders.
Figure 3:
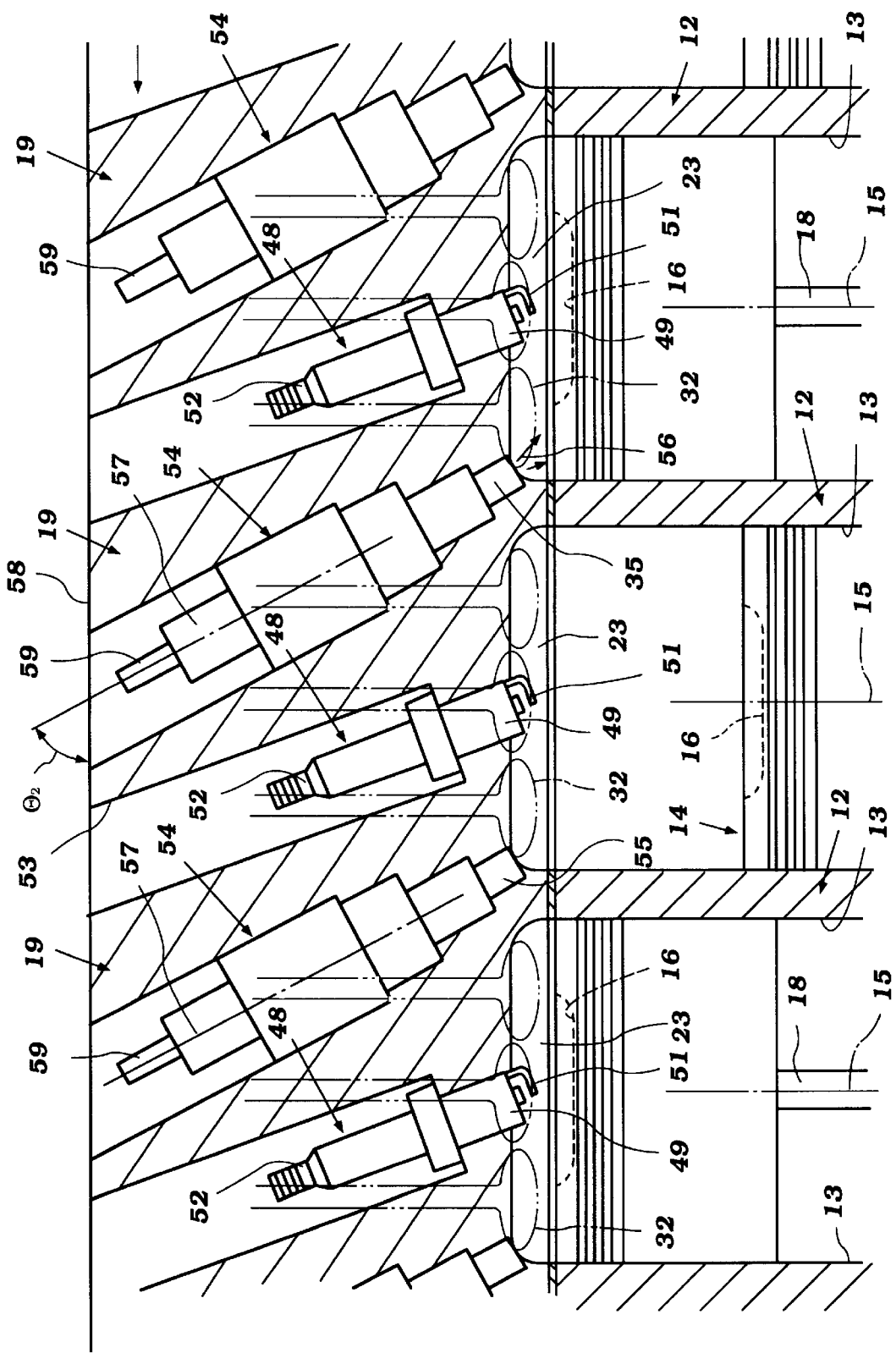
FIG. 3 is a cross-sectional view taken along a longitudinally extending plane passing through the cylinder bore axes and generally perpendicular to the plane of FIG. 1.

Referring first to the embodiment of FIGS. 1–3, an internal combustion engine constructed in accordance with this embodiment is shown partially and is identified generally by the reference numeral 11. The invention has particular utility in conjunction with multiple cylinder engines and engines wherein a cylinder bank has a plurality of aligned cylinder bores. Since, as noted from the aforenoted comments, the invention deals primarily with the combustion chamber of the engine and the components associated with it, only the upper portion of the cylinder block and the cylinder head have been depicted. Where any components of the engine 11 are not illustrated or described, they may be considered to be conventional. Or, alternatively, any conventional structure may be utilized for those components which are not illustrated.

The engine 11 is comprised of a cylinder block, indicated generally by the reference numeral 12, in which a plurality of aligned cylinder bores 13 are formed. In the drawings and particularly FIG. 3 it will be seen that four of these cylinder bores 13 appear. It is to be understood, however, that the invention may be utilized in conjunction with engines having one or more cylinders, although the invention has particular utility in conjunction with engines having at least two aligned cylinder bores. These engines may either have their aligned cylinders arranged all in one line or in banks of plural cylinders that are disposed at varying angles to each other, such as V-type engines.

Pistons, indicated generally by the reference numeral 14 are sidably supported in the cylinder bores 14 along axes 15 of the cylinder bores 13. These pistons 14 have head portions with a dome or bowl 16 formed therein to form what may be referred to as a lens shaped combustion chamber. The remaining components which define this combustion chamber will be described later.

The pistons 14 have bosses that receive piston pins 17 for pivotal connection to the upper or small ends of connecting rods 18. The lower ends of the connecting rods 18, which do not appear in the drawings for the aforenoted reasons, are journaled on the throws of a crankshaft in any well known manner.

A cylinder assembly, indicated generally by the reference numeral 19, is affixed to the cylinder block 12 in any known manner. Although the invention is described in conjunction with a detachable cylinder head, it should also be apparent that the invention may be utilized with engines wherein the cylinder head is integral with the cylinder block. The cylinder head 19 has a lower surface 21 which is in confronting relationship to the cylinder block 12 with a sealing gasket 22 disposed between the otherwise mating surfaces. The cylinder head surface 21 surrounds a plurality of recesses 32 which cooperate with the cylinder bores 13 and the piston heads including their bowl portions 16 to define the variable volume chambers in which combustion occurs. At times, the recesses 23 will be referred to as the "combustion chambers" since, at top dead center position, they form the substantial portion of the clearance volume.

In the illustrated embodiment, the engine 11 is depicted as being of the transverse type wherein a longitudinally extending plane containing the cylinder bore axes 15 extends transversely across the engine compartment of a motor vehicle. Thus, one side of the engine forms a front side, indicated by the arrow Fr, while the other side forms the rear side. Although the invention is described in conjunction with such an orientation, it will be obvious to those skilled in the art that the invention can be utilized with engines having other placements. However, the side-to-side relationship of the cylinder head is important so as to understand the location and placement of the various components, as will become apparent.

The cylinder head 19 is formed with an intake passage arrangement, indicated generally by the reference numeral 24 which extends on its forward side. There is provided an intake passage arrangement 24 serving each of the combustion chambers 23. In this embodiment, flow through the intake passage arrangement 24 is controlled by a control valve body 25 having a flow control valve 26 supported therein for rotation along with a control valve shaft 27. The function of the control valve 26 will be described later. This control valve 26 is disposed downstream of a main, operator controlled throttle valve (not shown).

The control valve body 25 is attached to an outwardly and forwardly facing surface 28 of the cylinder head and in which the passage 24 is formed in primary part. The passage 24, in this embodiment, is a single Siamese passage which serves three intake ports, each indicated by the reference numeral 29. In this embodiment, there are three such intake ports 29 which are comprised of a first intake port that is disposed further from the plane containing the cylinder bore axes 15 from the remaining two intake ports. These remaining two intake ports may be referred to as side intake ports, while the first mentioned intake port is the center intake port. The side intake ports 29 may extend in part over the longitudinal plane containing the cylinder bore axes 15. Flow into the combustion chamber 23 through the intake passage 24 and intake ports 29 in the direction indicated by the arrows 31 in the figures.

Poppet-type intake valves 32 are supported in the cylinder head assembly 19 by respective valve guides 33. Each poppet-type intake valve 32 valves a respective one of the intake ports 29. As may be seen best in FIG. 1, the side poppet-type valves 32 have their reciprocal axes that lie in a common plane that is disposed at an acute angle to the cylinder bore and the longitudinal plane containing the cylinder bore axes 15. The center intake valve 32 also lies at an acute angle to this plane but this is a lesser acute angle than that of the side intake valves. Of course, other orientations are possible.

Each of the poppet-type intake valves 32 is urged toward its closed position by a respective coil compression spring 34. The coil compression springs 34 act against the cylinder head assembly 19 and keeper retainer assemblies (not shown) affixed to the upper ends of the stems of the valves 32 for urging them toward closed positions.

Thimble-type tappets 35 are sidably supported in bores 36 of the cylinder head assembly 19. Each tappet 35 is associated with a respective one of the intake valves 32 for opening it. An intake camshaft 37 is rotatably journaled in the cylinder head assembly 19 in a suitable manner for actuating the tappets 35 and opening the intake valves 32 in a manner well-known in this art.

An exhaust passage arrangement, indicated generally by the reference numeral 38 is formed in the cylinder head assembly 19 for serving each of the combustion chambers 23. This exhaust passage arrangement 38 is also of a siamese-type in this embodiment and extends from a pair of exhaust ports 39 formed on the opposite side of the longitudinally-extending plane containing the cylinder bore axes 15 from the intake ports 29. These exhaust passages 38 extend through an external surface 41 of the cylinder head assembly 19 opposite to the surface 28. An exhaust manifold (not shown) receives the exhaust gases and delivers them to an exhaust system (not shown) for discharge to the atmosphere in any well-known manner. The flow direction of the exhaust gases is indicated by the arrows 42 in the figures.

Poppet-type exhaust valves 43 are mounted for reciprocation in the cylinder head assembly 19 by respective valve guides 43. These poppet-type exhaust valves 42 control the flow through the exhaust ports 39.

Like the intake valves 32, the exhaust valves 42 are urged toward their closed positions by coil compression springs 44. These springs 44 act against the cylinder head assembly 19 and keeper retainer assemblies (not shown) that are affixed to the upper ends of the stems of the exhaust valves 42.

Thimble-type tappets 45 are slidably supported in bores 46 in the cylinder head assembly 19 and cooperate with each of the exhaust valves 42 to open them. These tappets 45 are operated by an exhaust camshaft 46 that is journaled in the cylinder head assembly 19 in any known manner.

The intake and exhaust camshafts 37 and 46 and the associated valve actuating mechanism as thus far described is contained within a cam chamber formed at the upper end of the cylinder head assembly 19. This is closed by a cam cover 47 that is affixed to and forms a part of the cylinder head assembly 19. The camshafts 37 and 46 are driven by any suitable timing mechanism so as to rotate at one-half crankshaft speed, as is well known in this art.

Spark plugs, indicated generally by the reference numeral 48 are mounted in the cylinder head assembly 19. These spark plugs 48 have threaded portions 49 that are threaded into tapped openings formed in the cylinder head 19 so that the spark plug gaps 51 thereof are disposed substantially on the cylinder bore axes 15. The arrangement is such, however, so that the spark plugs 48 are disposed at an acute angle to planes containing the axis of each cylinder bore 15 and which extend perpendicularly to the longitudinally extending plane containing all of the cylinder bore axes 15 as previously referred to. Each spark plug 49 has a terminal end 52 that extends into a spark plug well 53 for attachment to a lead for firing the spark plugs 48 in a well-known manner.

An air charge is supplied to the combustion chambers 23 by the induction system which has already been described. In accordance with the invention, the engine is also provided with direct cylinder fuel injectors, indicated generally by the reference numeral 54 which are mounted in the cylinder head 19 in a specific orientation which will be described. It should be noted that each fuel injector 54 is preferably of the type that includes a solenoid valve which is operated by an electrical circuit so as to effect opening and closing of an injection valve that controls the flow through a nozzle port formed in a port portion 55 of each injector. The port portions 55 are disposed so that they open into the surface of the combustion chamber 23 of the corresponding cylinder head recess at one side of the cylinder bore 23. The spray pattern from these injectors 55 is indicated by the arrow 56 in FIG. 3.

Fuel is supplied to the fuel injectors from a high pressure supply system in any suitable manner.

It should be noted that each injector 54 has a respective axis 57 that is inclined to a vertical plane in an angle generally parallel to the inclination of the axes of the spark plugs 48. This results in the angular disposition of the fuel injectors 54 to an upper surface 58 of the cylinder head 19 at an angle indicated at θ1. The spark plug wells 53 also extend at substantially the same angle to this surface 58.

Like the spark plugs 48, the axes of the injectors 57 extend substantially on the longitudinal plane containing the axes of the cylinders bores 15. As a result of this disposition, it is possible to align the spark plugs 48 and fuel injectors 54 along the length of the engine in the direction of the plane containing the cylinder bore axes 15 and to place them in the area between the valves 32 and 42 and the camshafts 37 and 46 for ease of access. The injectors 54 all have terminal portions 59 that receive the terminals of a wire harness for supplying electrical power for actuating and controlling the fuel injectors 54 in the manner thus far described.

Because of this relationship, fuel that is introduced into the combustion chambers from the fuel injectors 54 will flow primarily at one side of the combustion chambers 23. Under high-speed/high-load conditions when there is long injection duration and since the spray is directed generally toward the spark gaps 51, good combustion will occur.

To improve combustion and to ensure that the charge is somewhat stratified, the control valve arrangement 26 is provided. The function of this may be best understood by reference to FIG. 2. As may be seen, the control valves 26 generally are of the butterfly type and have a cross-sectional configuration which is complementary to the control valve body 25 and specifically its opening which mates with the cylinder head intake passages 24. However, these valves are cut off at one side as indicated by the cutoff portion 61. Thus, under low speed and low loads, the control valves 26 are placed in a closed position. This causes the intake charge to be directed primarily toward the side intake valve port 29 that is disposed adjacent the injector nozzle portion 55 and to flow in a generally upward direction as indicated by the arrow 31 in FIG. 1.

As a result, this will cause some swirl and tumble action which will ensure that a stoichiometric charge is present at the spark plug gaps 51 under all running conditions and particularly the difficult low-speed, low-load conditions when the amount of fuel injected is relatively small. Because of this, the side placement of the injectors 54 is further facilitated and serviceability of the engine and ease of access of all components is readily assured.

Under high-speed/high-load conditions the control valves 26 are moved to their opening position and the air charge is delivered more uniformly to the combustion chamber through the intake ports 29. As noted, under this condition, the amount of fuel injected will be greater and this will ensure a homogenous mixture in the combustion chamber under high-speed/high-load conditions.

Figure 4:
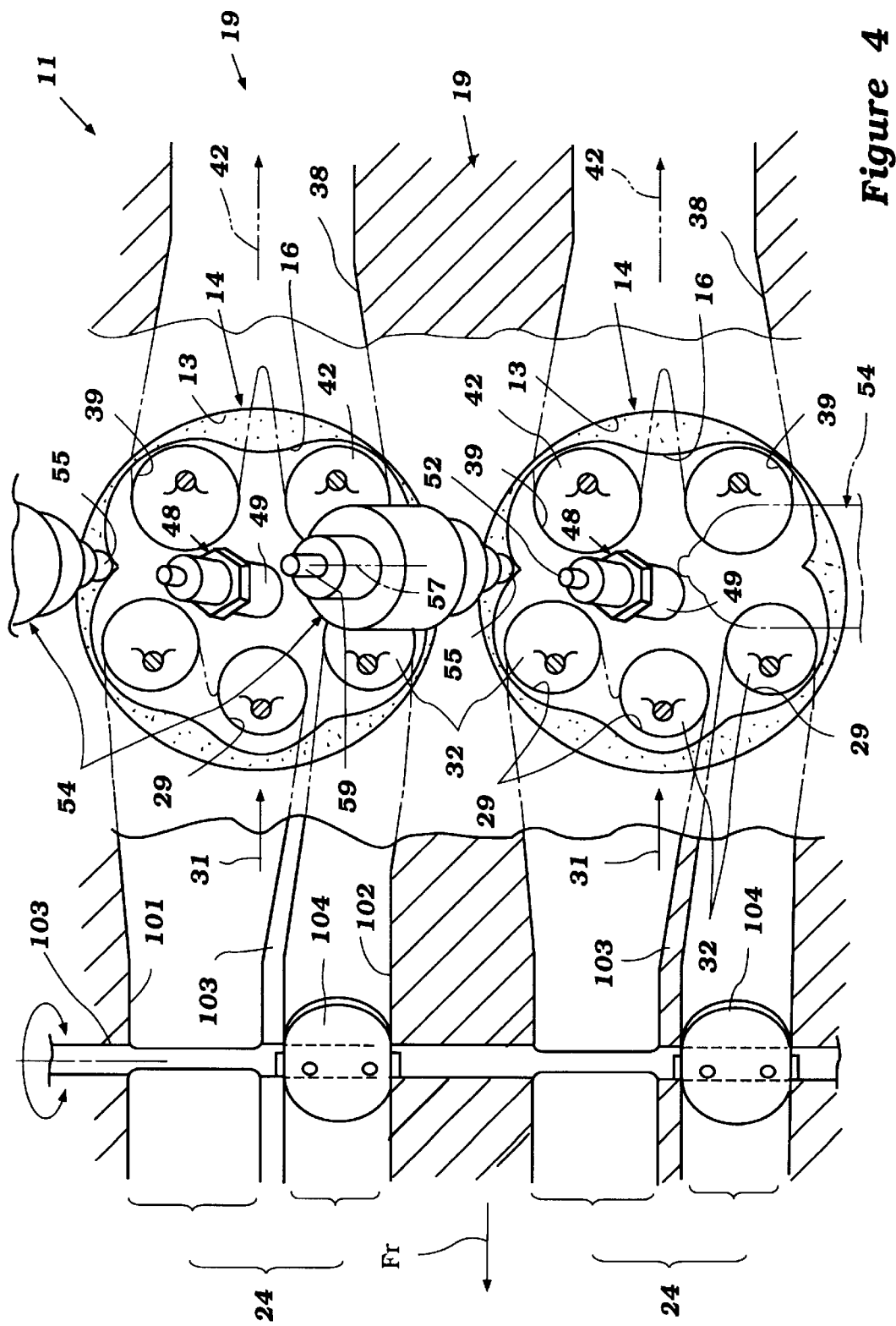
FIG. 4 is a cross-sectional view, in part similar to FIG. 2 and shows another control valve and porting arrangement.

FIG. 4 shows another embodiment of the invention which is basically the same as the embodiment as thus far described. In this embodiment, however, a different arrangement is provided for ensuring stratification under low-speed/low-load conditions and a homogenous mixture under high-speed/high-load conditions. In this case, the intake passages 24 are divided into a first or primary section, indicated by the reference numeral 101 which serves the center intake port 29 and the side intake port 29 which is adjacent the fuel injectors 54 and specifically their nozzle portions 55. A second high-speed induction passage 102 serves the remaining side intake port 29. The passages 101 and 102 are separated by an internal wall 103 of the cylinder head which extends to but terminates slightly short of the valve ports 29.

A single control valve 104 is mounted on a control valve shaft 105 and controls the flow only through the high-speed intake passage 102. Hence, under low-speed and low-load conditions, the control valves 104 are closed and the entire air flow for the combustion chamber 23 will pass only through the primary intake passage 101. As the load and speed increases, the control valves 104 will be progressively opened so as to result in a more homogenous mixture delivery.

Thus, from the foregoing description, it should be readily apparent that the described cylinder head and component placement permits the use of direct cylinder injection and yet full access for the fuel injectors, spark plugs and valve-actuating mechanism. Of course, the foregoing description is that of preferred embodiments of the invention and various changes and modifications may be made without departing from the spirit and scope of the invention, as defined by the appended claims.

What is claimed is:

1. An internal combustion engine comprised of a cylinder block defining at least one cylinder bore, a piston reciprocating in said cylinder bore, a cylinder head affixed to said cylinder block in closing relation to one end of said cylinder bore, said cylinder head, said cylinder bore and said piston defining a variable volume chamber in which combustion occurs, a crankshaft driven by said piston and rotatable about a longitudinally extending axis, an intake passage extending through one side of said cylinder head and terminating in at least one intake port serving said variable volume chamber on one side of a longitudinally extending plane containing the axis of said cylinder bore, an exhaust passage extending through the other side of said cylinder head from at least one exhaust port serving said variable volume chamber on the other side of said longitudinally extending plane, a spark plug mounted in said cylinder head and having a gap extending into said variable volume chamber for firing a charge therein and a single fuel injector mounted in said cylinder head and lying substantially on said longitudinally extending plane and having an injector nozzle port disposed within said variable volume chamber on one side of said cylinder bore for delivering the entire fuel charge required for combustion to said variable volume chamber.

2. An internal combustion engine as set forth in claim 1, wherein the fuel injector is inclined at an acute angle to a second plane extending perpendicular to the longitudinally extending plane and also containing the cylinder bore axis.

3. An internal combustion engine as set forth in claim 1, wherein the engine has a plurality of cylinder bores having their axis lying on the longitudinally extending plane and each served by an intake passage and an exhaust passage, as defined.

4. An internal combustion engine as set forth in claim 1, wherein at least one of the passages serves the variable volume chamber through a plurality of ports.

5. An internal combustion engine as set forth in claim 4, wherein there are a plurality of intake ports.

6. An internal combustion engine as set forth in claim 4, wherein there are a plurality of exhaust ports.

7. An internal combustion engine as set forth in claim 4, wherein there are a plurality of intake and exhaust ports.

8. An internal combustion engine as set forth in claim 7, further including control valve means in the intake passage for directing the flow through the intake port toward the side of the cylinder bore where the fuel injector nozzle portion is disposed under at least low speed, low load conditions.

9. An internal combustion engine as set forth in claim 1, further including control valve means in the intake passage for directing the flow through the intake port toward the side of the cylinder bore where the fuel injector nozzle portion is disposed under at least low speed, low load conditions.

10. An internal combustion engine comprised of a cylinder block defining at least one cylinder bore, a piston reciprocating in said cylinder bore, a cylinder head affixed to said cylinder block in closing relation to one end of said cylinder bore, said cylinder head, said cylinder bore and said piston defining a variable volume chamber in which combustion occurs, a crankshaft driven by said piston and rotatable about a longitudinally extending axis, an intake passage extending through one side of said cylinder head and terminating in at least one intake port serving said variable volume chamber on one side of a longitudinally extending plane containing the axis of said cylinder bore, an exhaust passage extending through the other side of said cylinder head from at least one exhaust port serving said variable volume chamber on the other side of said longitudinally extending plane, a spark plug mounted in said cylinder head and having a gap extending into said variable volume chamber for firing a charge therein, said spark plug being inclined at an acute angle to a second plane perpendicular to said longitudinally extending plane and also containing said cylinder bore axis, and a fuel injector mounted in said cylinder head and lying substantially on said longitudinally extending plane and disposed at an acute angle to said second plane, said fuel injector having an injector nozzle port disposed within said variable volume chamber on one side of said cylinder bore for delivering a fuel charge to said variable volume chamber.

11. An internal combustion engine as set forth in claim 10, wherein the angle of inclination of the fuel injector and the spark plug to the second plane are approximately equal.

12. An internal combustion engine as set forth in claim 10, wherein the engine has a plurality of cylinder bores having their axes lying on the longitudinally extending plane and each served by an intake passage and an exhaust passage, as defined.

13. An internal combustion engine as set forth in claim 12, wherein the angle of inclination of the fuel injectors and the spark plugs to the respective second planes are approximately equal.

14. An internal combustion engine as set forth in claim 13, wherein at least one of the passages serves the variable volume chamber through a plurality of ports.

15. An internal combustion engine as set forth in claim 14, wherein there are a plurality of intake ports.

16. An internal combustion engine as set forth in claim 14, wherein there are a plurality of exhaust ports.

17. An internal combustion engine as set forth in claim 14, wherein there are a plurality of intake and exhaust ports.

18. An internal combustion engine as set forth in claim 17, wherein the intake passage serves the variable volume chamber through at least three ports.

19. An internal combustion engine comprised of a cylinder block defining at least one cylinder bore, a piston reciprocating in said cylinder bore, a cylinder head affixed to said cylinder block in closing relation to one end of said cylinder bore, said cylinder head, said cylinder bore and said piston defining a variable volume chamber in which combustion occurs, a crankshaft driven by said piston and rotatable about a longitudinally extending axis, an intake passage extending through one side of said cylinder head and terminating in at least one intake port serving said variable volume chamber on one side of a longitudinally extending plane containing the axis of said cylinder bore, an exhaust passage extending through the other side of said cylinder head from at least one exhaust port serving said variable volume chamber on the other side of said longitudinally extending plane, a spark plug having a gap extending into said variable volume chamber for firing a charge therein, a fuel injector lying substantially on said longitudinally extending plane and having an injector nozzle port disposed within said variable volume chamber on one side of said cylinder bore for delivering a fuel charge to said variable volume chamber, and control valve means in said intake passage for selectively directing the flow through the intake port toward the side of the cylinder bore where the fuel injector nozzle portion is disposed under at least low speed, low load conditions.

\* \* \* \* \*